(No Model.)
T. E. ATKINSON.
APPARATUS FOR RECTIFYING SPIRITS AND SPIRITUOUS LIQUORS BY ELECTRICITY.
No. 312,948.  Patented Feb. 24, 1885.
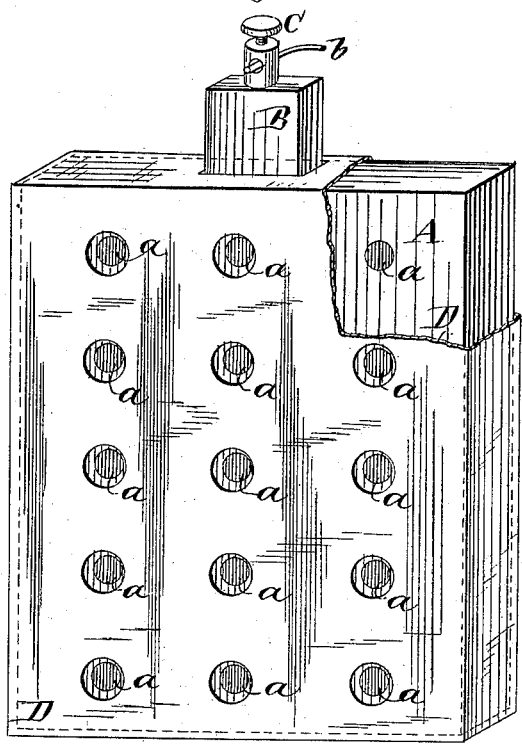
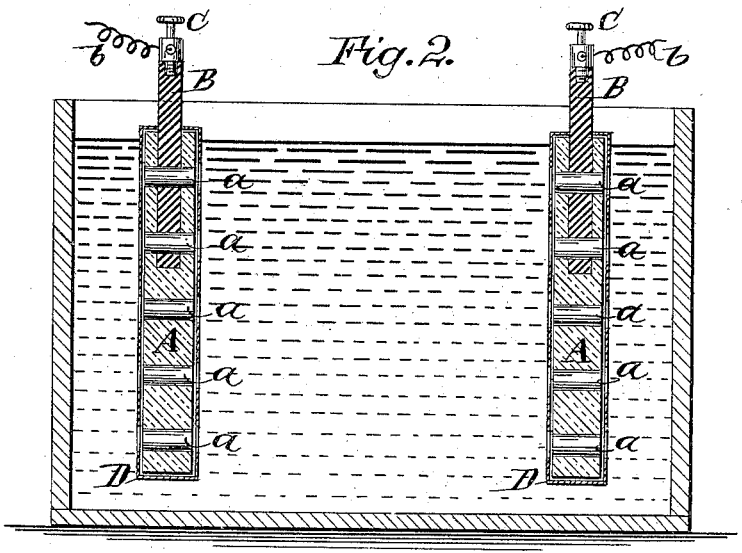
WITNESSES:
INVENTOR:
T. E. Atkinson
BY
ATTORNEYS.

UNITED STATES PATENT OFFICE.

THOMAS EMORY ATKINSON, OF SAN FRANCISCO, CALIFORNIA.

APPARATUS FOR RECTIFYING SPIRITS AND SPIRITUOUS LIQUORS BY ELECTRICITY.

SPECIFICATION forming part of Letters Patent No. 312,948, dated February 24, 1885.

Application filed April 4, 1884. (No model.)

*To all whom it may concern:*

Be it known that I, THOMAS E. ATKINSON, of San Francisco, in the county of San Francisco and State of California, have invented a new and Improved Apparatus for Rectifying Spirits and Spirituous Liquors by Electricity, of which the following is a full, clear, and exact description.

The object of my invention is to improve, age, and rectify spirituous liquors through the agency of electricity.

My invention consists in an electrode, of hard wood, provided with one or more carbon conductors perforated transversely with a number of holes, charred over its exterior surface and in the transverse holes, and having a covering of canvas provided with apertures corresponding with the holes in the electrode.

Reference is to be had to the accompanying drawings, forming part of this specification, in which similar letters of reference indicate corresponding parts in both the figures.

Figure 1 is a perspective view with a portion of the canvas covering removed from the electrode; and Fig. 2 is a vertical longitudinal section of a tank containing liquor being operated upon by the current flowing through the electrodes, which are shown in transverse section.

A plank, A, of hard wood, of a size and shape adapted to the tank in which it is to be used, is perforated transversely with a number of holes, $a$, and in the top thereof is formed a mortise or socket for receiving a carbon rod, B, which is provided with a binding-post, C, for receiving the electric conductor $b$. The entire surface of the wood, including the surfaces in the transverse holes, is charred. The plank A is closely enveloped in a canvas covering, D, having apertures coinciding with the perforations $a$.

Two of the electrodes just described are inserted in the tank of liquor to be aged and rectified, as shown in Fig. 2, and the conductors $b$ are connected with the battery or other generator of electricity. The current, in passing from one electrode to the other through the liquor, imparts to the liquor the flavor of the oak or hickory or other wood of which the electrodes are made. The impurities contained by the liquor are precipitated by the current, and the germs of ferment are destroyed by contact with the charred surface of the wood.

The several carbon rods B may be inserted in the upper edge of the electrodes when it is desired to distribute the current over a large area, and the electrodes may be made of any size or shape to adapt them to the tanks or vessels in which they are used, and they may be made of different varieties of wood to vary the flavor imparted to the liquor.

Having thus described my invention, I claim as new and desire to secure by Letters Patent—

1. An electrode formed of wood and perforated with transverse holes, and charred over its entire exposed surface, as described.

2. The combination, with an electrode, of one or more carbon rods inserted therein and adapted to receive the electric current, as described.

3. The combination, with a charred wooden electrode, of a canvas covering, as described.

4. The combination, with the charred wooden electrode A, having transverse perforations $a$, of a canvas covering, D, having apertures coinciding with the perforations $a$, as described.

THOMAS EMORY ATKINSON.

Witnesses:
T. J. FRENCH,
H. B. ARNOLD.